United States Patent
Dacosta

(10) Patent No.: US 8,028,328 B2
(45) Date of Patent: *Sep. 27, 2011

(54) SYSTEM AND METHOD FOR AUTHENTICATING COMPONENTS IN WIRELESS HOME ENTERTAINMENT SYSTEM

(75) Inventor: Behram Mario Dacosta, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/567,411

(22) Filed: Sep. 25, 2009

(65) Prior Publication Data

US 2010/0017858 A1    Jan. 21, 2010

Related U.S. Application Data

(63) Continuation of application No. 11/355,280, filed on Feb. 14, 2006, now Pat. No. 7,640,577.

(51) Int. Cl.
*G06F 15/173* (2006.01)
(52) U.S. Cl. ......................................................... 726/4
(58) Field of Classification Search .................. 709/223, 709/225, 228, 229; 726/4, 22, 26
See application file for complete search history.

(56) References Cited

U.S. PATENT DOCUMENTS

| | | | |
|---|---|---|---|
| 4,259,720 A * | 3/1981 | Campbell | 705/71 |
| 4,408,203 A * | 10/1983 | Campbell | 705/71 |
| 6,868,292 B2 * | 3/2005 | Ficco et al. | 700/19 |
| 7,260,714 B2 * | 8/2007 | Dawson et al. | 713/155 |
| 7,356,691 B2 * | 4/2008 | Dawson | 713/155 |

* cited by examiner

*Primary Examiner* — David Eng
(74) *Attorney, Agent, or Firm* — John L. Rogitz

(57) ABSTRACT

Configuration information is exchanged between a home entertainment system server and various wireless components by pushing a button on the server and a random button on a remote control device as it is pointed at the devices sought to be authenticated.

8 Claims, 2 Drawing Sheets

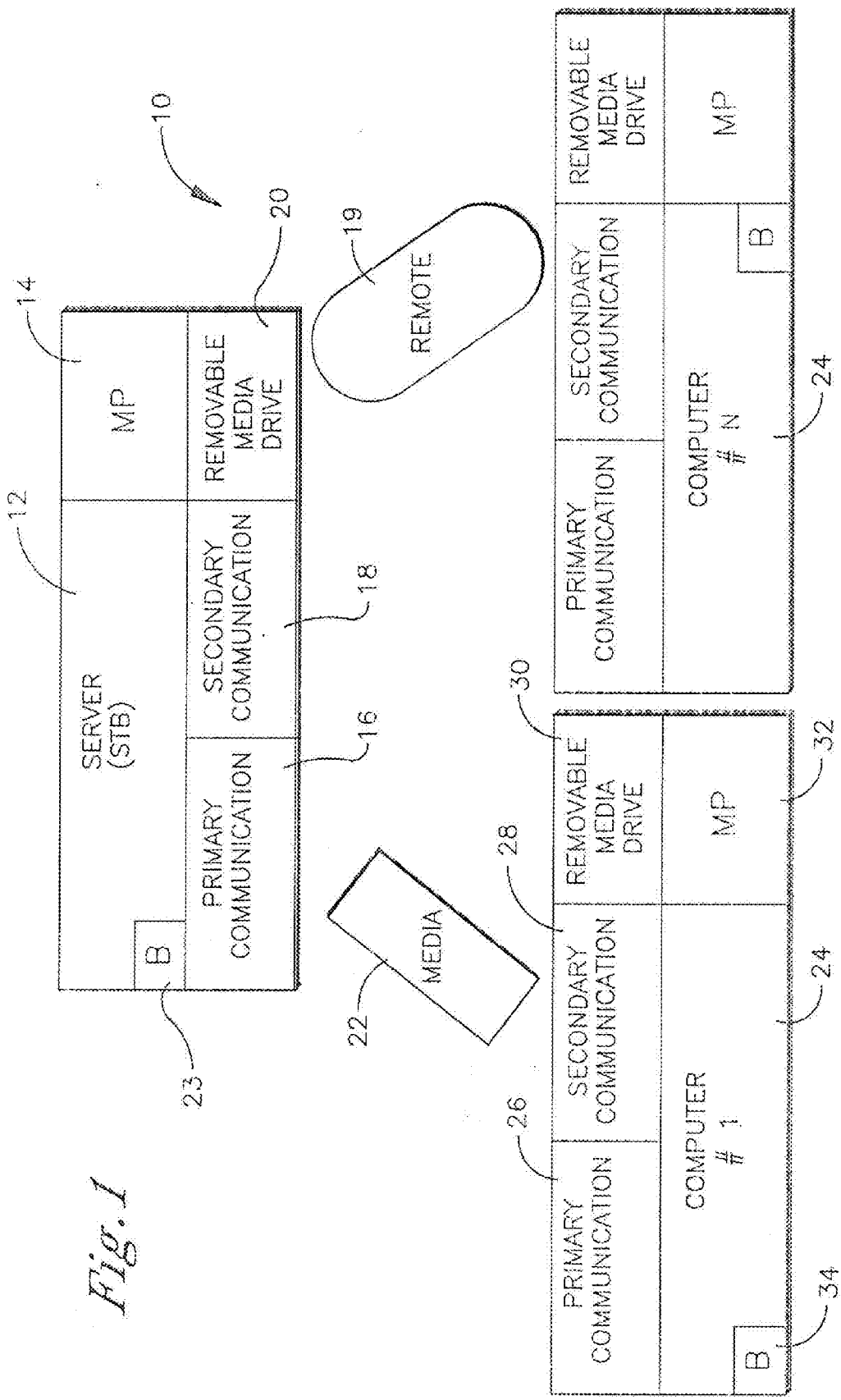

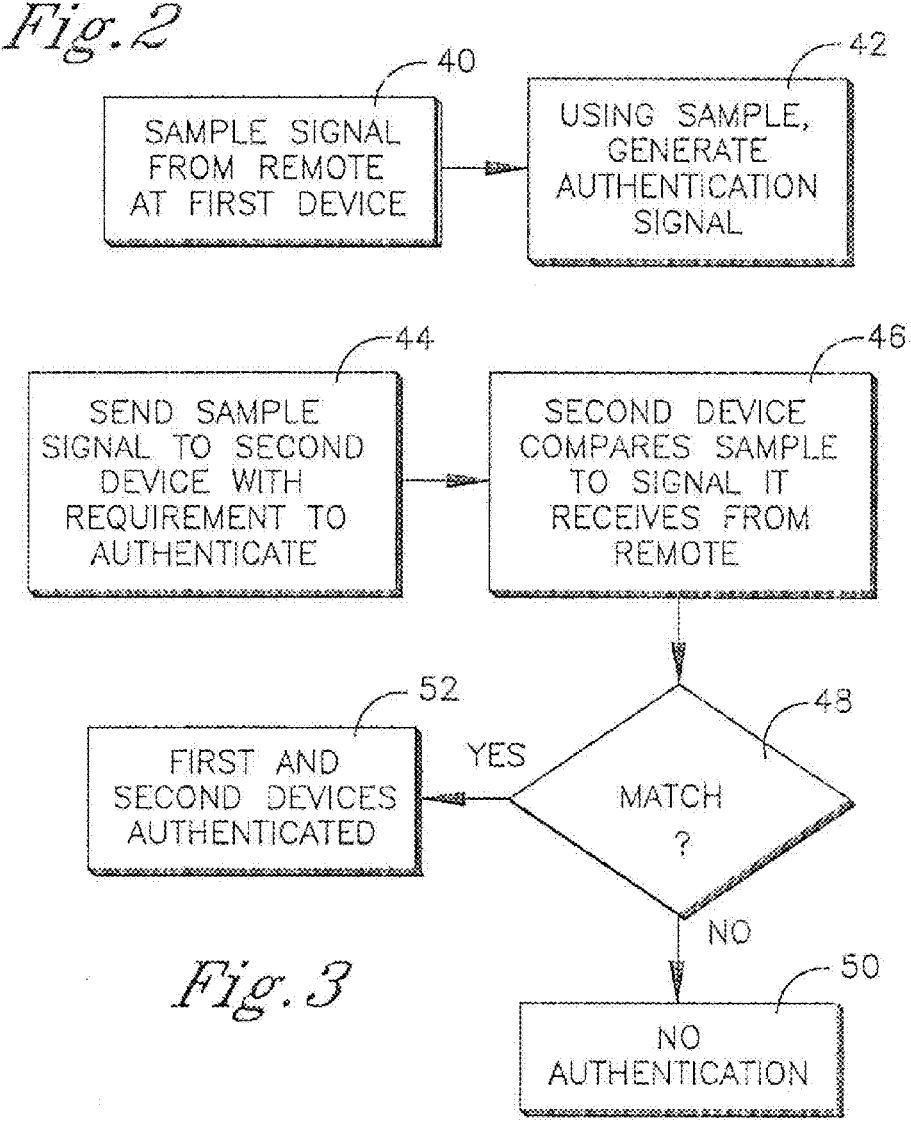
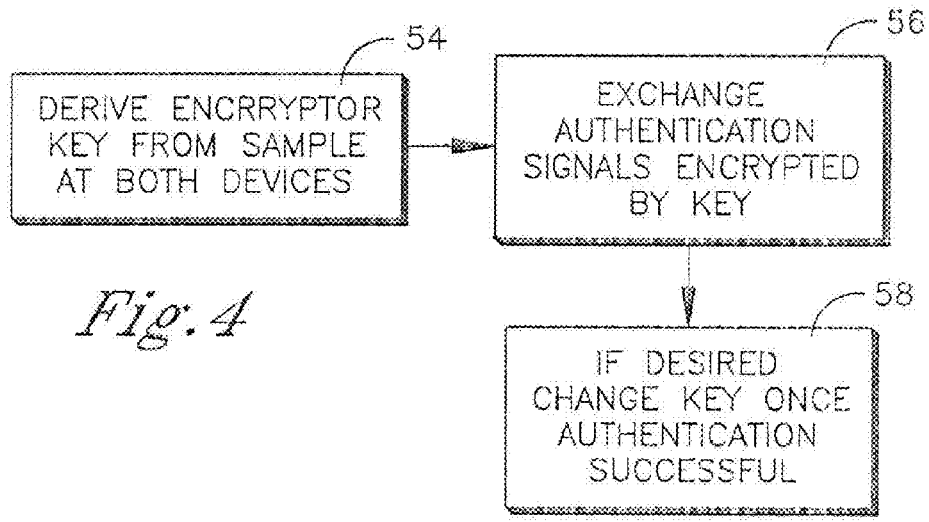

SYSTEM AND METHOD FOR AUTHENTICATING COMPONENTS IN WIRELESS HOME ENTERTAINMENT SYSTEM

This is a continuation of and claims priority to U.S. patent application Ser. No. 11/355,280, filed Feb. 14, 2006, now U.S. Pat. No. 7,640,577.

RELATED APPLICATIONS

This application is related to U.S. patent application Ser. No. 10/782,345, incorporated herein by reference.

BACKGROUND OF THE INVENTION

I. Field of the Invention

The present invention relates generally to home entertainment systems.

II. Description of the Related Art

Wireless home entertainment systems have been provided that can include a set-top box media server that communicates over a wireless system such as an 802.11 system with various components in the home, e.g., TVs, laptop computers, and custom display devices. It is desirable that a rogue device not be permitted on the home network, which would otherwise permit the rogue device to steal content or confidential information on the network and to upload viruses into the network. Also, it is desirable that a component in one home network not mistakenly and non-maliciously gain entry into a neighboring home network.

Accordingly, many wireless home networks require that configuration information (e.g., encryption keys, medium access controller (MAC) addresses) be exchanged between the server and a component seeking admission to the network, prior to providing the component access to the network. The sharing of information ideally is automatically verifiable without user intervention, particularly for consumer electronic devices. Unfortunately, existing systems typically require the user to manually enter information into one or both devices, to ensure that an eavesdropping rogue device outside the home cannot gain admission to the network, and this is not desirable for many devices, e.g., consumer electronic devices. As an alternative, the server and component can be paired at the factory but this results in inflexibility, as the component can be used only with the server with which it is paired.

Recognizing these drawbacks, the solutions provided in the above-referenced patent application have been provided. Additionally, the present invention provides still further solutions and advantages. Specifically, the present invention recognizes that when a person attempts to authenticate one home device with another, the authentication signals could unintentionally be received in a neighbor's home and thereby undesirably result in one device in a first home being authenticated to another device in a second home. The present invention is directed at preventing authentication ambiguity.

SUMMARY OF THE INVENTION

A home entertainment system has a wireless system server with a communication system and at least one wireless component having at least one communication system configured for communicating with the communication system of the server. A remote control device is configured for communicating with the server and the component. The remote control device generates a wireless signal. As set forth further below, the wireless signal is used to generate an authentication signal that in turn is used for authentication between the component and server.

In one non-limiting implementation, the server sends a signal representing the wireless signal to the component, and the component also receives the wireless signal from the remote control device. Accordingly, the component can compare the wireless signal as actually received from the remote to the signal from the server, and if a match is found, it is determined that authentication exists between the server and component. If desired, the server may include a button and the authentication signal is generated from the wireless signal only if the button is pressed within a predetermined time of receiving the wireless signal from the remote control device. In non-limiting implementations the wireless signal is associated with one and only one key on the remote control device, and the key is not constrained to be predetermined.

In an alternate non-limiting implementation, the server and component derive a common encryption key from the wireless signal. The encryption key is used to exchange authentication data between the server and component.

The communication system can be, e.g., a power line communication (PLC) system or an IEEE 802.11 system. The server can be established by a set-top box receiver.

In another aspect, a method for authenticating a component in a home network with a server in the network includes pointing a remote control device at the server and pressing a "ready" button indicating that authentication is impending. The "ready" button can be on the server and/or the remote control device. The method then includes randomly selecting a button on the remote control device and pressing the randomly selected button to generate a wireless signal. Next, the remote control device is pointed at the component and the randomly selected button again is pressed to generate the wireless signal. From one of: the server, or the component, a signal is sent representing the wireless signal to the other of: the server, or the component, which then compares the wireless signal it received from the remote control device with the signal representing the wireless signal. If a match is found, it is determined that authentication exists between the server and component.

In still another aspect, a method is disclosed for authenticating a component in a home network with a server in the network. The method includes pointing a remote control device at the server and pressing a "ready" button indicating that authentication is impending. The "ready" button can be on the server and/or the remote control device. The method then includes randomly selecting a button on the remote control device and pressing the randomly selected button to generate a wireless signal. Next, the remote control device is pointed at the component and the randomly selected button is again pressed to generate the wireless signal. At both the server and component, an encryption key is derived from the wireless signal, and authentication information that is encrypted by the key is exchanged between the server and component.

BRIEF DESCRIPTION OF THE DRAWINGS

The details of the present invention, both as to its structure and operation, can best be understood in reference to the accompanying drawings, in which like reference numerals refer to like parts, and in which:

FIG. 1 is a block diagram of the system of the present invention;

FIG. 2 is a flow chart of the generalized logic for authenticating components;

FIG. 3 is a flow chart of one non-limiting implementation of the logic of FIG. 2; and FIG. 4 is a flow chart of another non-limiting, preferred implementation of the logic of FIG. 2.

DETAILED DESCRIPTION OF THE PREFERRED EMBODIMENTS

Referring initially to FIG. 1, a home entertainment system is shown, generally designated 10, that includes a server 12 having a processor or processors 14 that may be housed in a set-top box or personal video recorder (PVR) or other component. The server 12 can receive televised content from an antenna, satellite dish, cable, etc. for display of the content on one or more of the below-described system components. The processor 14 alternatively can be incorporated into the housing of a TV to function in accordance with the disclosure herein, or it can be implemented by plural processors (e.g., one in a PVR and one in the TV or set-top box) acting in concert with each other. Or, the server 12 may be implemented by a computer such as a PC or laptop.

In the preferred non-limiting embodiment shown, the processors described herein may access one or more software or hardware elements to undertake the present logic. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

The preferred server 12 shown in FIG. 1 includes a primary wireless communication system 16, such as an 802.11 communication system, or a primary wired communication system such as a power line communication (PLC) network, and a secondary communication system 18 that is out-of-band with the primary system 16. As set forth further below, the secondary communication system 18 may be a line-of-sight infrared (IR) system, in which case a television or other IR remote control device 19 may be provided. Or, the secondary communication system 18 may be a near-field communication system having an effective range of communication of, e.g., twenty five feet or less. A near-field system may be implemented by a near field "Smart Card", and may have a frequency of between five and fifteen megaHertz (5 MHz-15 MHz) and use Amplitude Shift Keying (ASK). As understood herein, smart-card like functionality for proximal communication can be incorporated into mobile telephones or other devices. Yet again, the secondary communication system 18 may use personal area network (PAN) principles known in the art to transfer information between the server 12 and the components discussed through a person's body below when the person touches an electrode that is part of each component's secondary communication system. In such an implementation the carrier frequency may be under one megaHertz (<1 MHz), and on-off shift keying may be used for modulation.

In addition, the server 12 can have a removable media drive 20 with which a removable media 22, such as a Sony Memory Stick®, floppy diskette, other flash memory, universal serial bus (USB) dongles, or other removable memory media can be detachably engaged to exchange information between the server 12 and the components discussed below. The drive 20 with media 22 can be considered to be a secondary communication system that is out-of-band with the primary system 16. One or more buttons 23 can also be provided on the server 12 for purposes to be shortly disclosed.

FIG. 1 shows that the system 10 includes one or more components 24, each of which communicates with the primary communication system 16 of the server 12 using a respective primary communication system 26. The components 24 may include, e.g., televisions, laptop computers, audio players, projectors, custom display devices, and so on. The primary communication systems are used to communicate, e.g., audio/video data streams from the server 12 to the components 24 for presentation on displays associated with the components 24. Other data may also be transferred over the primary communication systems.

Each component 24 may also include a respective secondary communication system 28 that communicates with the secondary communication system 18 of the server 12 in accordance with principles set forth below to exchange configuration information, including, e.g., encryption keys, MAC addresses, SSIDs, and other confidential information that is necessary for authentication and association and that is desired to be kept from an unauthorized device. Also, each component 24 may include a respective removable media drive 30, and be controlled by a respective processor 32. One or more buttons 34 may be provided on each component 24.

Now referring to FIG. 2, the general logic for exchanging configuration information between the server 12 and components 24 can be seen. Commencing at block 40, a person manipulates the remote control device 19 to send a signal to one or both of two devices to be authenticated to each other, e.g., the server 12 and first component 24. At block 42, based on the signal from the remote, an authentication signal is generated.

Details of how the overall logic of FIG. 2 is implemented can be seen in FIGS. 3 and 4. First considering FIG. 3, the user points the remote 19 at, e.g., the server (STB) 12 and presses any key on the remote. The user might also simultaneously or within a predetermined short period of time depress the button 23 to signal to the server 12 that authentication is impending. Or, a predetermined button on the remote 19 may be used for this function.

In any case, at block 44 the server 12 samples the incoming IR bit-stream (digital pulses) from the remote control 19. Based on, e.g., the temporal pattern of these sampled pulses (pulse pattern), at block 44 the server 12 sends (e.g., by transmitting in a packet) this IR pulse pattern received from the remote control, or a suitable description/representation of this IR pulse pattern, to the device to which authentication is sought. If desired, this can be sent along with a request-to-authenticate message.

The user then points the remote 19 at the second device and presses the same randomly selected key as was pressed when pointing the remote at the server. At block 46, the second device compares the pulse pattern received from the server 12 with the pulse pattern it samples from the IR remote control 19 (since the user will have pressed the same key on the same remote control while also pointing to device-2). It is determined at decision diamond 48 whether the two pulse patterns match. If no match is found, the logic moves to block 50 to deny authentication. However, if a match is found the second device concludes at block 52 that the user intends to authenticate it with the server 12 and not, say, with another unintended device that might also have sent a request to authenticate to the second device but with a different pulse pattern from what second device has received directly from the remote control. This can occur in the event that the other, unintended device is being simultaneously (and coincidentally) configured by the user's neighbor. Accordingly, when a match is found, authentication is deemed to exist between the two devices.

FIG. 4 shows an alternate, preferred implementation of the general logic of FIG. 2. Commencing at block 54, when the user points the remote 19 at the server 12 and presses any random key (along with, if desired, the button 23 on the server 12), the server 12 derives an encryption key from the signal from the remote. In one non-limiting embodiment, the server 12 applies a function, or a mapping, to the pulse pattern it receives from the remote control device. This function produces a comparatively unique or rare encryption key that is used to communicate with other devices on the network. The encryption key may for example be a symmetric key used to encrypt and decrypt messages using the AES technique used in many devices including 802.11a devices based on the 802.11i protocol.

Other devices can decrypt messages from the server 12 only if they possess the same encryption key (same as decryption key for symmetrical ciphers). Accordingly, when the user desires to authenticate the server 12 with a second device in the network, the user points the remote 19 at the second device and presses the same randomly selected key on the remote as was pressed when the remote was pointed at the server 12. The second device for which authentication is sought then uses the same algorithm to generate the encryption key as was used by the server 12. This is possible because the second device receives the same pulse pattern from the (same) remote control when the user presses the same randomly selected key on the remote. In contrast, an unintended device in a neighbor's home undergoing the same authentication regime most likely will receive a different pulse pattern, since the pulses it receives most likely would be generated by a different randomly selected key on the neighbor home remote than the key that was randomly selected by the user of the server 12/remote 19. In addition, the same key pressed on remote controls provided by different manufacturers or for different device models can often also generate different temporal patterns.

Proceeding to block 56, authentication information, encrypted by the encryption key generated at block 54, is exchanged between the two devices for which mutual authentication is sought. The encryption key can be treated as an initial key, so that at block 58 it can be immediately changed (over the secure channel if desired) to produce a second key which is used for further communications. This second key may optionally be changed over time as well.

While the particular SYSTEM AND METHOD FOR AUTHENTICATING COMPONENTS IN WIRELESS HOME ENTERTAINMENT SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A home entertainment system, comprising:
a remote control device configured for communicating with a server and a component configured to communicate with the server using a communication system, the remote control device generating a wireless signal to the component, the wireless signal being used to generate an authentication signal, the authentication signal being useful by the component for authentication between the component and server, the system further comprising the server, wherein the server includes at least one button and the authentication signal is generated from the wireless signal only if the button is pressed within a predetermined time of receiving the wireless signal from the remote control device.

2. The system of claim 1, comprising the server and the component, wherein the server sends a signal representing the wireless signal to the component, the component also receiving the wireless signal from the remote control device, the component comparing the wireless signal to the signal from the server representing the wireless signal and if a match is found, determining that authentication exists between the server and component and otherwise not determining that authentication exists between the server and component.

3. The system of claim 2, wherein the server samples the wireless signal from the remote control device.

4. The system of claim 1, wherein the wireless signal is associated with one and only one key on the remote control device, the key not being constrained to be predetermined.

5. The system of claim 1, comprising the server and the component, wherein the server and component derive an encryption key from the wireless signal, the encryption key being used to encrypt authentication data between the server and component.

6. The system of claim 1, wherein the communication system is a power line communication (PLC) system.

7. The system of claim 1, wherein the communication system is an 802.11 system.

8. The system of claim 1, wherein the server is established by a set-top box receiver.

\* \* \* \* \*